UNITED STATES PATENT OFFICE.

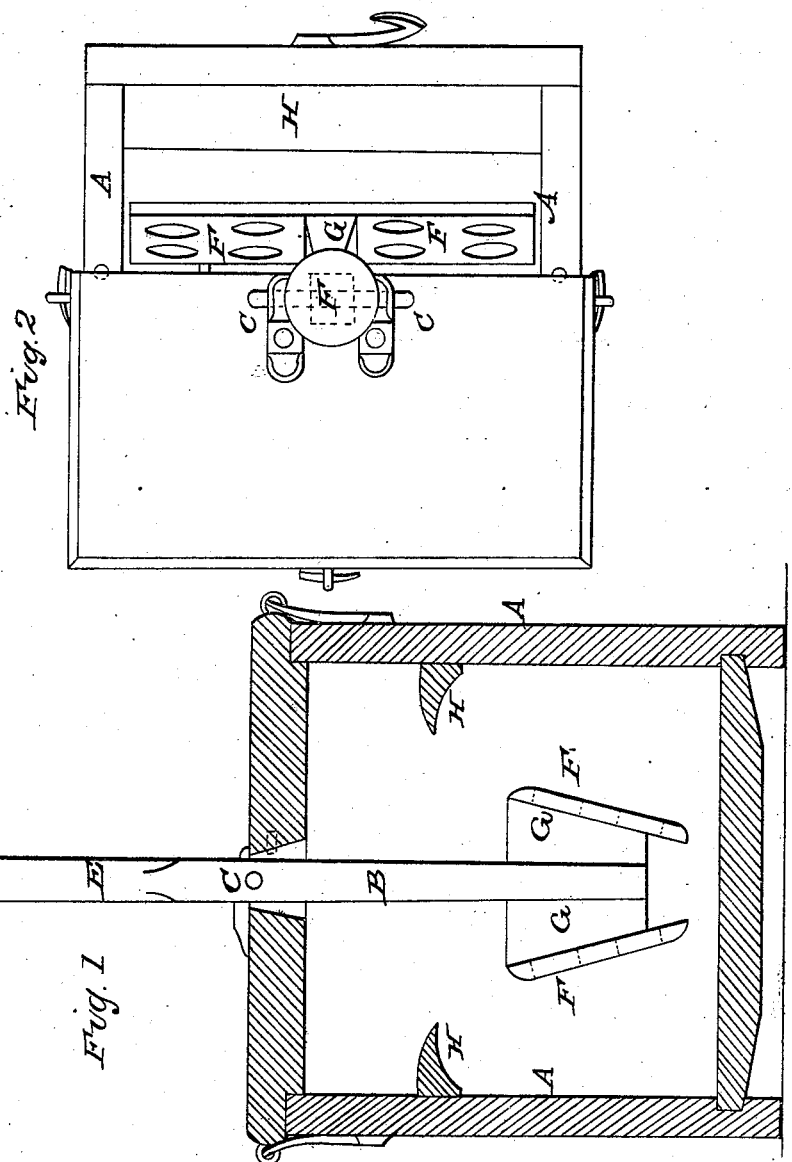

MOSES NEAL, OF KALAMAZOO, MICHIGAN.

IMPROVEMENT IN CHURNS.

Specification forming part of Letters Patent No. 52,313, dated January 30, 1866.

*To all whom it may concern:*

Be it known that I, MOSES NEAL, of the town and county of Kalamazoo, in the State of Michigan, have made new and useful Improvements in Churns; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a central vertical sectional view. Fig. 2 is a top view.

My improvement consists of a vibrating dasher-churn, in which the beaters are so placed on the shaft as to be about parallel to the sides when respectively and alternately brought into contact therewith, preventing the cream from establishing a vertical or circular motion and compelling it to escape directly past the edges of the beaters, the portion escaping upwardly being deflected by the breakers and returned backward and downward behind the beater.

In the drawings, A is the body of the churn, which I prefer to make of a square form. B is the dasher-shaft, which is pivoted at C in the lid D, having an oscillating motion by the movement of the handle E, the dashers F F moving in an arc of a circle in a vertical plane.

The dashers F have holes through them, and are so set upon the blocks G, by which they are connected to the dasher-shaft, that when either dasher is moved over to the side of the churn it is about parallel with the side against which it impinges.

H H are breakers, attached to the sides of the churn, toward which the milk or cream is caused to cross violently from side to side of the churn, and it is the design to cause it to impinge directly and violently against the portions of the churn in contradistinction to merely rolling upon itself, as, for instance, when it forms a vortex or maintains a circular motion. The cream, being compressed against the side of the churn or driven against it by the approaching dasher, escapes in all the available directions. It passes in direct contact with the edges of the dasher and with the edges and sides of the holes therein, creating a friction and violent contact therewith. Some portion escapes against the sides and bottom, and the part which escapes above is deflected by the breaker H and turned downward and backward behind the dasher which impelled it.

This operation can be satisfactorily performed only by the dasher, which bears a shape and position relatively to the side, so as to cause the cream to be violently displaced by approaching contact of parallel surfaces, and the controlling feature of economy and compactness rendering it necessary to place them on one shaft. We assume relatively to the vertical sides the position shown in Fig. 1.

Having described my invention, what I claim therein as new, and desire to secure by Letters Patent, is—

The vibrating dasher-rod pivoted with beaters so placed that when in contact with the sides they are parallel therewith, in combination with the vessel A and breakers H, the whole constructed and operating substantially as described and represented.

MOSES NEAL.

Witnesses:
ROLLIN WOOD,
A. L. HILLS.